(12) United States Patent
Liu

(10) Patent No.: US 9,489,479 B2
(45) Date of Patent: Nov. 8, 2016

(54) RULE AND LITHOGRAPHIC PROCESS CO-OPTIMIZATION

(71) Applicant: ASML NETHERLANDS B.V., Veldhoven (NL)

(72) Inventor: Xiaofeng Liu, Campbell, CA (US)

(73) Assignee: ASML NETHERLANDS B.V., Veldhoven (NL)

(*) Notice: Subject to any disclaimer, the term of this patent is extended or adjusted under 35 U.S.C. 154(b) by 14 days.

(21) Appl. No.: 14/398,416

(22) PCT Filed: Apr. 16, 2013

(86) PCT No.: PCT/EP2013/057938
§ 371 (c)(1),
(2) Date: Oct. 31, 2014

(87) PCT Pub. No.: WO2013/164187
PCT Pub. Date: Nov. 7, 2013

(65) Prior Publication Data
US 2015/0089459 A1 Mar. 26, 2015

Related U.S. Application Data

(60) Provisional application No. 61/642,765, filed on May 4, 2012.

(51) Int. Cl.
*G06F 17/50* (2006.01)
*G03F 7/20* (2006.01)
*H05K 3/00* (2006.01)

(52) U.S. Cl.
CPC .......... *G06F 17/5045* (2013.01); *G03F 7/705* (2013.01); *G03F 7/70525* (2013.01); *G06F 17/5081* (2013.01); *G03F 7/7065* (2013.01);
(Continued)

(58) Field of Classification Search
CPC .. G03F 7/705; G03F 7/7065; G06F 2217/12; H05K 2203/05; H05K 3/0005
USPC ...................................................... 716/50–52
See application file for complete search history.

(56) References Cited

U.S. PATENT DOCUMENTS 7,194,704 B2   3/2007   Kotani
7,587,704 B2   9/2009   Ye
8,136,078 B2   3/2012   Nackaerts
(Continued)

OTHER PUBLICATIONS

J. W. Blatchford et al., "Litho/Design Co-Optimization and Area Scaling for the 22-NM Logic Node" The Electrochemical Society pp. 449-454 (2010) (6 pages).
(Continued)

*Primary Examiner* — Stacy Whitmore
(74) *Attorney, Agent, or Firm* — Pillsbury Winthrop Shaw Pittman LLP

(57) ABSTRACT

A computer-implemented method for obtaining values of one or more design variables of one or more design rules for a pattern transfer process comprising a lithographic projection apparatus, the method comprising: simultaneously optimizing one or more design variables of the pattern transfer process and the one or more design variables of the one or more design rules. The optimizing comprises evaluating a cost function that measures a metric characteristic of the pattern transfer process, the cost function being a function of one or more design variables of the pattern transfer process and one or more design variables of the one or more design rules.

21 Claims, 8 Drawing Sheets

(52) U.S. Cl.
CPC ......... *G06F 2217/12* (2013.01); *H05K 3/0005* (2013.01); *H05K 2203/05* (2013.01)

(56) References Cited

U.S. PATENT DOCUMENTS

| | | | | |
|---|---|---|---|---|
| 8,336,003 B2* | 12/2012 | Cheng | ...................... | G03F 1/38 716/50 |
| 8,415,077 B2* | 4/2013 | Agarwal | ............ | G03F 7/70433 382/144 |
| 8,438,508 B2 | 5/2013 | Liu | | |
| 8,560,978 B2* | 10/2013 | Feng | ...................... | G03F 1/144 378/35 |
| 8,584,056 B2* | 11/2013 | Chen | ...................... | G03F 1/144 716/53 |
| 8,739,082 B2* | 5/2014 | Liu | ...................... | G03F 1/144 716/52 |
| 8,745,551 B2* | 6/2014 | Feng | ................. | G02B 19/0095 716/132 |
| 8,806,394 B2* | 8/2014 | Feng | ...................... | G03F 1/144 378/35 |
| 8,819,601 B2* | 8/2014 | Chen | ................. | G03F 7/70433 716/54 |
| 8,856,693 B2* | 10/2014 | Cheng | ...................... | G03F 1/38 716/50 |
| 8,893,060 B2* | 11/2014 | Feng | ...................... | G03F 1/70 716/51 |
| 8,898,599 B2* | 11/2014 | Liu | ................... | G06F 17/5068 716/54 |
| 8,938,696 B1* | 1/2015 | Torunoglu | ......... | G06F 17/5068 716/53 |
| 9,183,324 B2* | 11/2015 | Liu | ...................... | G03F 1/144 |
| 9,213,783 B2* | 12/2015 | Hansen | ................. | G06F 17/50 |
| 2009/0296055 A1* | 12/2009 | Ye | ...................... | G03F 7/70266 355/30 |
| 2011/0099526 A1* | 4/2011 | Liu | ...................... | G03F 1/144 716/54 |
| 2011/0230999 A1* | 9/2011 | Chen | ...................... | G03F 1/144 700/105 |
| 2012/0117521 A1* | 5/2012 | Feng | ...................... | G03F 1/144 716/54 |
| 2012/0117522 A1* | 5/2012 | Feng | ...................... | G03F 1/70 716/54 |
| 2012/0124529 A1* | 5/2012 | Feng | ................. | G02B 19/0095 716/54 |
| 2012/0198396 A1* | 8/2012 | Kajiwara | ................ | H01L 22/20 716/54 |
| 2012/0216156 A1* | 8/2012 | Liu | ...................... | G03F 1/144 716/52 |
| 2012/0227015 A1 | 9/2012 | Blatchford | | |
| 2013/0179847 A1* | 7/2013 | Hansen | ................... | G06F 17/50 716/54 |
| 2013/0212543 A1* | 8/2013 | Crouse | ................ | G06F 17/5081 716/52 |
| 2013/0311958 A1* | 11/2013 | Liu | ...................... | G03F 1/144 716/53 |
| 2013/0326437 A1* | 12/2013 | Liu | ................... | G06F 17/5068 716/54 |
| 2014/0033145 A1* | 1/2014 | Feng | ...................... | G03F 1/144 716/54 |
| 2014/0068530 A1* | 3/2014 | Chen | ...................... | G03F 1/144 716/54 |
| 2014/0123082 A1* | 5/2014 | Akhssay | ............ | G06F 17/5081 716/52 |
| 2014/0282303 A1* | 9/2014 | Feng | ................. | G02B 19/0095 716/54 |
| 2014/0365983 A1* | 12/2014 | Chen | ................. | G03F 7/70433 716/53 |
| 2015/0074622 A1* | 3/2015 | Feng | ...................... | G03F 1/70 716/54 |

OTHER PUBLICATIONS

T. Dam et al., "Exploring the Impact of Mask Making Constraints on Double Patterning Design Rules", Proc. of SPIE vol. 8166 816629-1, (2011) (12 pages).

* cited by examiner

RULE AND LITHOGRAPHIC PROCESS CO-OPTIMIZATION

CROSS-REFERENCE TO RELATED APPLICATIONS

This application is a U.S. National Phase patent application of PCT/EP2013/057938, filed Apr. 16, 2013, which claims the benefit of U.S. provisional application 61/642,765, which was filed on May 4, 2012, all of which are hereby incorporated by reference in the present disclosure in their entirety.

FIELD

The description herein relates to lithographic apparatuses and processes, and more particularly to tools for optimizing design rule parameters, illumination sources and masks design layouts for use in lithographic apparatuses and processes.

BACKGROUND

Lithographic projection apparatuses can be used, for example, in the manufacture of integrated circuits (ICs). In such a case, the mask may contain a circuit pattern corresponding to an individual layer of the IC, and this pattern can be imaged onto a target portion (e.g., comprising one or more dies) on a substrate (e.g., a silicon wafer) that has been coated with a layer of radiation-sensitive material (resist). In general, a single wafer will contain a whole network of adjacent target portions that are successively irradiated via the projection system of a lithographic projection apparatus, one at a time. In one type of lithographic projection apparatus, each target portion is irradiated by exposing the entire mask pattern onto the target portion in one go; such an apparatus is commonly referred to as a wafer stepper. In an alternative apparatus, commonly referred to as a step and scan apparatus, each target portion is irradiated by progressively scanning the mask pattern under the projection beam in a given reference direction (the "scanning" direction) while synchronously scanning the substrate table parallel or anti parallel to this direction. Since, in general, the projection system will have a magnification factor M (generally <1), the speed V at which the substrate table is scanned will be a factor M times that at which the mask table is scanned. More information with regard to lithographic devices as described herein can be gleaned, for example, from U.S. Pat. No. 6,046,792, incorporated herein by reference.

In a manufacturing process using a lithographic projection apparatus, a mask pattern is imaged onto a substrate that is at least partially covered by a layer of radiation sensitive material (resist). Prior to this imaging step, the substrate may undergo various procedures, such as priming, resist coating and a soft bake. After exposure, the substrate may be subjected to other procedures, such as a post exposure bake (PEB), development, a hard bake and measurement/inspection of the imaged features. This array of procedures is used as a basis to pattern an individual layer of a device, e.g., an IC. Such a patterned layer may then undergo various processes such as etching, ion implantation (doping), metallization, oxidation, chemo mechanical polishing, etc., all intended to finish off an individual layer. If several layers are required, then the whole procedure, or a variant thereof, will have to be repeated for each new layer. Eventually, an array of devices will be present on the substrate (wafer). These devices are then separated from one another by a technique such as dicing or sawing, whence the individual devices can be mounted on a carrier, connected to pins, etc.

For the sake of simplicity, the projection system may hereinafter be referred to as the "lens"; however, this term should be broadly interpreted as encompassing various types of projection systems, including refractive optics, reflective optics, and catadioptric systems, for example. The projection system may also include components operating according to any of these design types for directing, shaping or controlling the projection beam of radiation, and such components may also be referred to below, collectively or singularly, as a "lens". Further, the lithographic projection apparatus may be of a type having two or more substrate tables (and/or two or more mask tables). In such "multiple stage" devices the additional tables may be used in parallel, or preparatory steps may be carried out on one or more tables while one or more other tables are being used for exposures.

The photolithographic masks referred to above comprise geometric patterns corresponding to the circuit components to be integrated onto a silicon wafer. The patterns used to create such masks are generated utilizing CAD (computer-aided design) programs, this process often being referred to as EDA (electronic design automation). Most CAD programs follow a set of predetermined design rules in order to create functional masks. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the wafer (via the mask).

As noted, lithography is a central step in the manufacturing of semiconductor integrated circuits, where patterns formed on substrates define the functional elements of semiconductor devices, such as microprocessors, memory chips etc. Similar lithographic techniques are also used in the formation of flat panel displays, micro-electro mechanical systems (MEMS) and other devices.

As semiconductor manufacturing processes continue to advance, the dimensions of circuit elements have continually been reduced while the amount of functional elements, such as transistors, per device has been steadily increasing over decades, following a trend commonly referred to as "Moore's law". At the current state of technology, critical layers of leading-edge devices are manufactured using optical lithographic projection systems known as scanners that project a mask image onto a substrate using illumination from a deep-ultraviolet laser light source, creating individual circuit features having dimensions well below 100 nm, i.e. less than half the wavelength of the projection light.

This process in which features with dimensions smaller than the classical resolution limit of an optical projection system are printed, is commonly known as low-k1 lithography, according to the resolution formula $CD=k_1\times\lambda/NA$, where $\lambda$ is the wavelength of radiation employed (currently in most cases 248 nm or 193 nm), NA is the numerical aperture of the projection optics, CD is the "critical dimension"—generally the smallest feature size printed—and k1 is an empirical resolution factor. In general, the smaller k1, the more difficult it becomes to reproduce a pattern on the wafer that resembles the shape and dimensions planned by a circuit designer in order to achieve particular electrical functionality and performance. To overcome these difficulties, sophisticated fine-tuning steps are applied to the projection system as well as to the mask design. These include, for example, but not limited to, optimization of NA and optical coherence settings, customized illumination schemes, use of phase shifting masks, optical proximity correction in the mask layout, or other methods generally defined as "resolution enhancement techniques" (RET).

As one important example of RET, optical proximity correction (OPC), addresses the fact that the final size and placement of a printed feature on the wafer will not simply be a function of the size and placement of the corresponding feature on the mask. It is noted that the terms "mask" and "reticle" are utilized interchangeably herein. One of ordinary skill in the art appreciates that the terms "mask" and "reticle" encompass transmissive or reflective patterning devices such as a programmable mirror array or LCD matrix. For the small feature sizes and high feature densities present on typical circuit designs, the position of a particular edge of a given feature will be influenced to a certain extent by the presence or absence of other adjacent features. These proximity effects arise from minute amounts of light coupled from one feature to another. Similarly, proximity effects may arise from diffusion and other chemical effects during post-exposure bake (PEB), resist development, and etching that generally follow lithographic exposure.

In order to ensure that the features are generated on a semiconductor substrate in accordance with the requirements of the given target circuit design, proximity effects need to be predicted utilizing sophisticated numerical models, and corrections or pre-distortions need to be applied to the design of the mask before successful manufacturing of high-end devices becomes possible. In a typical high-end design almost every feature edge requires some modification in order to achieve printed patterns that come sufficiently close to the target design. These modifications may include shifting or biasing of edge positions or line widths as well as application of "assist" features that are not intended to print themselves, but will affect the properties of an associated primary feature. In the semiconductor industry, microlithography (or simply lithography) is the process of printing circuit patterns on a semiconductor wafer (for example, a silicon or GaAs wafer). Currently, optical lithography is the predominant technology used in volume manufacturing of semiconductor devices and other devices such as flat-panel displays. Such lithography employs light in the visible to the deep ultraviolet spectral range to expose photosensitive resist on a substrate. In the future, extreme ultraviolet (EUV) and soft x-rays may be employed. Following exposure, the resist is developed to yield a resist image.

FIG. 1 illustrates an exemplary lithographic projection system 10. The major components are a light source 12, which may be, for example, a deep-ultraviolet excimer laser source, or a source of other wavelengths, including EUV wavelength, illumination optics, which define the partial coherence, and which may include specific source shaping optics 14, 16a and 16b; a mask or reticle 18; and projection optics 16c that produce an image of the reticle pattern onto the wafer plane 22. An adjustable filter or aperture 20 at the pupil plane may restrict the range of beam angles that impinge on the wafer plane 22, where the largest possible angle defines the numerical aperture of the projection optics $NA=\sin(\theta_{max})$.

An exemplary flow chart for simulating lithography in a lithographic projection apparatus is illustrated in FIG. 2. A source model 31 represents optical characteristics (including light intensity distribution and/or phase distribution) of the source. A projection optics model 32 represents optical characteristics (including changes to the light intensity distribution and/or the phase distribution caused by the projection optics) of the projection optics. A design layout model 35 represents optical characteristics (including changes to the light intensity distribution and/or the phase distribution caused by a given design layout 33) of a design layout, which is the representation of an arrangement of features on a mask. An aerial image 36 can be simulated from the design layout model 35, the projection optics model 32 and the design layout model 35. A resist image 38 can be simulated from the aerial image 36 using a resist model 37. Simulation of lithography can, for example, predict contours and CDs in the resist image.

More specifically, it is noted that the source model 31 can represent the optical characteristics of the source that include, but not limited to, NA-sigma ($\sigma$) settings as well as any particular illumination source shape (e.g. off-axis light sources such as annular, quadrupole, and dipole, etc.). The projection optics model 32 can represent the optical characteristics of the of the projection optics that include aberration, distortion, refractive indexes, physical sizes, physical dimensions, etc. The design layout model 35 can also represent physical properties of a physical mask, as described, for example, in U.S. Pat. No. 7,587,704, which is incorporated by reference in its entirety. The objective of the simulation is to accurately predict, for example, edge placements and CDs, which can then be compared against an intended design. The intended design is generally defined as a pre-OPC design layout which can be provided in a standardized digital file format such as GDSII or OASIS or other file format.

When the resist is exposed by the projected image and thereafter baked and developed, the resist tends to undergo complex chemical and physical changes. The final resist patterns are typically characterized by their critical dimensions, or CD, usually defined as the width of a resist feature at the resist-substrate interface. While the CD is usually intended to represent the smallest feature being patterned in the given device, in practice the term CD is used to describe the linewidth of any resist feature.

In most exposure tools, the optical system reduces the size of the pattern from the mask level to the wafer level by a reduction factor, typically 4 or 5. Because of this the pattern at the mask level is typically larger than the desired pattern at the wafer level, which relaxes the dimensional control tolerances required at the mask level and improves the yield and manufacturability of the mask-making process. This reduction factor of the exposure tool introduces certain confusion in referring to "the dimension" of the exposure process. Herein, features sizes and dimensions refer to wafer-level feature sizes and dimensions, and the "minimum feature size" refers to a minimum feature at the wafer level.

For an exposure process to pattern a device correctly, the CDs of all critical structures in the device must be patterned to achieve the design target dimensions. Since it is practically impossible to achieve every target CD with no errors, the device is designed with a certain tolerance for CD errors. In this case, the pattern is considered to be acceptable if the CDs of all critical features are within these predefined tolerances. For the exposure process to be viable in a manufacturing environment, the full CD distribution must fall within the tolerance limits across a range of process conditions that represents the typical range of process variations expected to occur in the fab. For example, the actual doses of nominally identical process conditions can vary up to ±5% from the nominal dose; the actual focal planes of nominally identical process conditions can vary up to ±100 nm from the nominal focal plane.

Factors that limit or degrade the fidelity of the pattern transfer process include imperfections in the mask-making process, in the projection optics, in the resist process, and in the control of the interaction between the projected light and the film stacks formed on the wafer. However, even with a perfect mask, perfect optics, a perfect resist system, and perfect substrate reflectivity control, image fidelity becomes difficult to maintain as the dimensions of the features being imaged become smaller than the wavelength of light used in the exposure tool. For exposure processes using 193 nm illumination sources, features as small as 65 nm are desired. In this deep sub-wavelength regime, the pattern transfer process becomes highly non-linear, and the dimensions of the final pattern at the wafer level become a very sensitive function not only of the size of the pattern at the mask level, but also of the local environment of the feature, where the local environment extends out to a radius of roughly five to ten times the wavelength of light. Given the very small feature sizes compared to the wavelength, even identical structures on the mask will have different wafer-level dimensions depending on the sizes and proximities of neighboring features, and even features that are not immediately adjacent but still within the proximity region defined by the optics of the exposure tool.

In an effort to improve imaging quality and minimize high non-linearity in the pattern transfer process, current processing techniques employ various RET and OPC, a general term for any technology aimed at overcoming proximity effects. One of the simplest forms of OPC is selective bias. Given a CD vs. pitch curve, all of the different pitches could be forced to produce the same CD, at least at best focus and exposure, by changing the CD at the mask level. Thus, if a feature prints too small at the wafer level, the mask level feature would be biased to be slightly larger than nominal, and vice versa. Since the pattern transfer process from mask level to wafer level is non-linear, the amount of bias is not simply the measured CD error at best focus and exposure times the reduction ratio, but with modeling and experimentation an appropriate bias can be determined. Selective bias is an incomplete solution to the problem of proximity effects, particularly if it is only applied at the nominal process condition. Even though such bias could, in principle, be applied to give uniform CD vs. pitch curves at best focus and exposure, once the exposure process varies from the nominal condition, each biased pitch curve will respond differently, resulting in different process windows for the different features. Therefore, the "best" bias to give identical CD vs. pitch may even have a negative impact on the overall process window, reducing rather than enlarging the focus and exposure range within which all of the target features print on the wafer within the desired process tolerance.

Other more complex OPC techniques have been developed for application beyond the one-dimensional bias example above. A two-dimensional proximity effect is line end shortening. Line ends have a tendency to "pull back" from their desired end point location as a function of exposure and focus. In many cases, the degree of end shortening of a long line end can be several times larger than the corresponding line narrowing. This type of line end pull back can result in catastrophic failure of the devices being manufactured if the line end fails to completely cross over the underlying layer it was intended to cover, such as a polysilicon gate layer over a source-drain region. Since this type of pattern is highly sensitive to focus and exposure, simply biasing the line end to be longer than the design length is inadequate because the line at best focus and exposure, or in an underexposed condition, would be excessively long, resulting either in short circuits as the extended line end touches neighboring structures, or unnecessarily large circuit sizes if more space is added between individual features in the circuit. Since one of the key goals of integrated circuit design and manufacturing is to maximize the number of functional elements while minimizing the area required per chip, adding excess spacing is a highly undesirable solution.

Two-dimensional OPC approaches have been developed to help solve the line end pull back problem. Extra structures (or assist features) known as "hammerheads" or "serifs" are routinely added to line ends to effectively anchor them in place and provide reduced pull back over the entire process window. Even at best focus and exposure these extra structures are not resolved but they alter the appearance of the main feature without being fully resolved on their own. A "main feature" as used herein means a feature intended to print on a wafer under some or all conditions in the process window. Assist features can take on much more aggressive forms than simple hammerheads added to line ends, to the extent the pattern on the mask is no longer simply the desired wafer pattern upsized by the reduction ratio. Assist features such as serifs can be applied to many more cases than simply reducing line end pull back. Inner or outer serifs can be applied to any edge, especially two dimensional edges, to reduce corner rounding or edge extrusions. With enough selective biasing and assist features of all sizes and polarities, the features on the mask bear less and less of a resemblance to the final pattern desired at the wafer level. In general, the mask pattern becomes a pre-distorted version of the wafer-level pattern, where the distortion is intended to counteract or reverse the pattern deformation that will occur during the lithographic process to produce a pattern on the wafer that is as close to the one intended by the designer as possible.

Many of these OPC techniques can be used together on a single mask with phase-shifting structures of different phases added in as well for both resolution and process window enhancement. The simple task of biasing a one-dimensional line becomes increasingly complicated as two-dimensional structures must be moved, resized, enhanced with assist features, and possibly phase-shifted without causing any conflict with adjoining features. Due to the extended proximity range of deep sub-wavelength lithography, changes in the type of OPC applied to a feature can have unintended consequences for another feature located within half a micron to a micron. Since there are likely to be many features within this proximity range, the task of optimizing OPC decoration becomes increasingly complex with the addition of more aggressive approaches. Each new feature that is added has an effect on other features, which then can be re-corrected in turn, and the results can be iterated repeatedly to converge to a mask layout where each feature can be printed in the manner in which it was originally intended while at the same time contributing in the proper manner to the aerial images of its neighboring features such that they too are printed within their respective tolerances.

SUMMARY

A computer-implemented method for obtaining values of one or more design variables of one or more design rules for a pattern transfer process comprising a lithographic projection apparatus, the method comprising: simultaneously optimizing one or more design variables of the pattern transfer process and the one or more design variables of the one or more design rules.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Embodiments will now be described in detail with reference to the drawings, which are provided as illustrative examples. Notably, the figures and examples below are not meant to limit the scope to a single embodiment, but other embodiments are possible by way of interchange of some or all of the described or illustrated elements. Moreover, where certain elements described herein can be partially or fully implemented using known components, only those portions of such known components that are necessary for an understanding of the description herein will be described, and detailed descriptions of other portions of such known components will be omitted without obscuration. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the scope is intended to encompass other embodiments including a plurality of the same component, and vice-versa, unless explicitly stated otherwise herein. Moreover, any term in the specification or claims is not intended to be ascribed an uncommon or special meaning unless explicitly set forth as such.

In a pattern transfer process, a pattern printed on a substrate by a lithographic projection apparatus is a function of at least parameters of the pattern transfer process and parameters of patterns on one or more layers or reticles. Parameters of the pattern transfer process may comprise parameters of the lithographic projection apparatus and/or parameters of pre-exposure or post-exposure procedures. Parameters of pre-exposure or post-exposure procedures can include pre-exposure or post-exposure baking (e.g., temperature and duration), post-exposure etching (e.g., etchant composition, etching duration), resist coating, resist development, etc. Parameters of the lithographic projection apparatus can include dose, mask bias, illumination source shape, etc. Parameters of the patterns on the layers or reticles can include a variety of geometric parameters of the patterns. Variations in the patterns on the layer or reticle can affect the optimal values of the parameters of the lithographic projection apparatus; variations in the lithographic projection apparatus can affect the optimal values of the parameters of the patterns on the layers or reticles. Here, the "optimal value" of a parameter means that when the parameter has the optimal value, a metric characteristic of the pattern transfer process is at a favorable value. For example, the metric can be a process window of the pattern transfer process; a wider process window is more desirable.

Figure 3A:
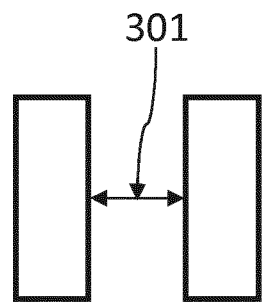
FIGS. 3A-3G show exemplary design rule parameters.
Figure 3B:
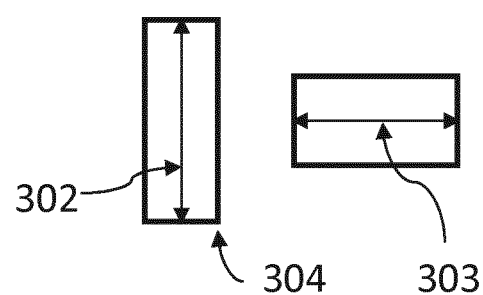
Figure 3C:
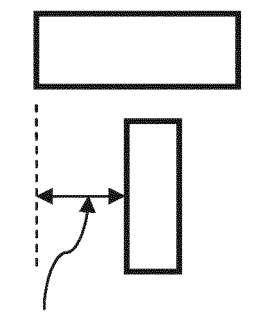
Figure 3D:
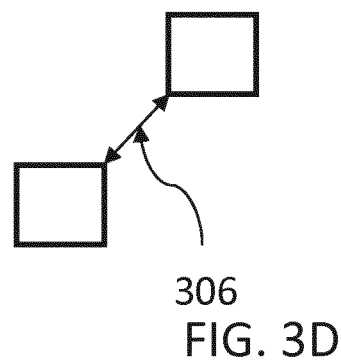
Figure 3E:
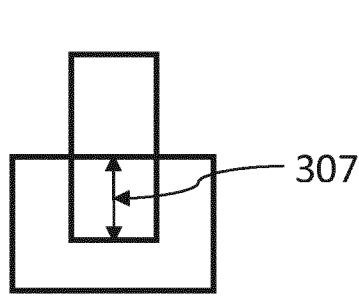
Figure 3F:
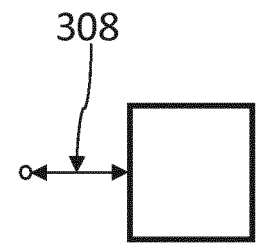
Figure 3G:
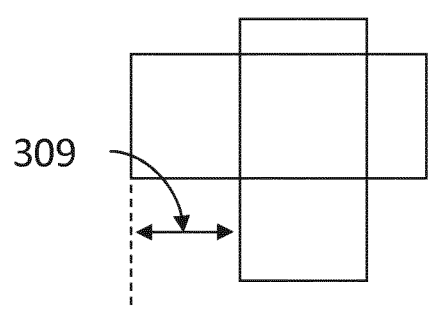

FIGS. 3A-3G show exemplary parameters of the patterns. FIG. 3A shows a parameter 301. The parameter 301 is an edge-to-edge distance between two patterns. FIG. 3B shows parameters 302-304. The parameter 302 is a height of a pattern. The parameter 303 is a width of a pattern. The parameter 304 is an absolute position of an edge of a pattern. FIG. 3C shows a parameter 305. The parameter 305 is a distance between an edge of a pattern to an extended line of another edge of the same pattern or of a different pattern. FIG. 3D shows a parameter 306. The parameter 306 is a corner-to-corner distance. FIG. 3E shows a parameter 307. The parameter 307 is a dimension of an overlap between two patterns. FIG. 3F shows a parameter 308. The parameter 308 is a distance between an edge of a pattern to a fixed point on the layer or reticle. FIG. 3G shows a parameter 309. The parameter 309 is a geometric parameter relating to two patterns configured to be produced on different reticles or on different layers in the pattern transfer process (here, for example, the hatched and the unhatched patterns are on different reticles or layers). Other exemplary parameters of the patterns can include an aspect ratio of a pattern and pitches of an array of patterns. The parameters of the patterns are not limited to the examples in FIGS. 3A-3G but can be any geometric characteristics of the patterns or any relationship between these geometric characteristics, wherein the patterns may be on a same layer or reticle or on different layers or reticles in a multi-layer pattern transfer process.

In one method of designing patterns being configured to be produced on reticles, a set of design rules are followed to increase the chance that the reticle is useable in a specific pattern transfer process. Differences in the pattern transfer process may lead to different sets of design rules for the individual pattern transfer processes. A design rule may be a constraint on the parameters of the patterns on the reticles (e.g., an upper limit and a lower limit of one of parameters 301-309 in FIGS. 3A-3G). Conventionally, after the patterns are designed following the set of design rules, optimal values of the parameters of the pattern transfer process are derived for these patterns. However, because both the patterns and the lithographic projection apparatus affect the pattern transfer process, there might be other patterns designed following a different set of design rules that can yield even more favorable value of the metric characteristic of the pattern transfer process.

To find a favorable value of the metric, one may resort to a brutal force approach. Optimal values of the parameters of the pattern transfer process may be found for many different set of design rules and a set of design rules that gives the favorable value of the metric is selected. For example, there are two parameters (the upper limit and the lower limit of one of parameters 301-309 in FIGS. 3A-3G) of the design rules and each of the two parameters of the design rules may assume values between 1 nm to 10 nm. In the brutal force approach, assuming an increment of 1 nm for the two parameters of the design rules gives reasonably exhaustive search of the favorable value of the metric, the optimal values of the parameters of the pattern transfer process must be derived for 10×10=100 different combinations of the two parameters of the design rules, and a combination that gives the favorable value of the metric among these 100 combination is selected. This brutal force approach is already very computationally expensive when there are merely two parameters of the design rules. If there are more than two parameters of the design rules, which is very likely in a practical pattern design process, the computational expense will increase exponentially to the extent of impracticality.

Figure 4:
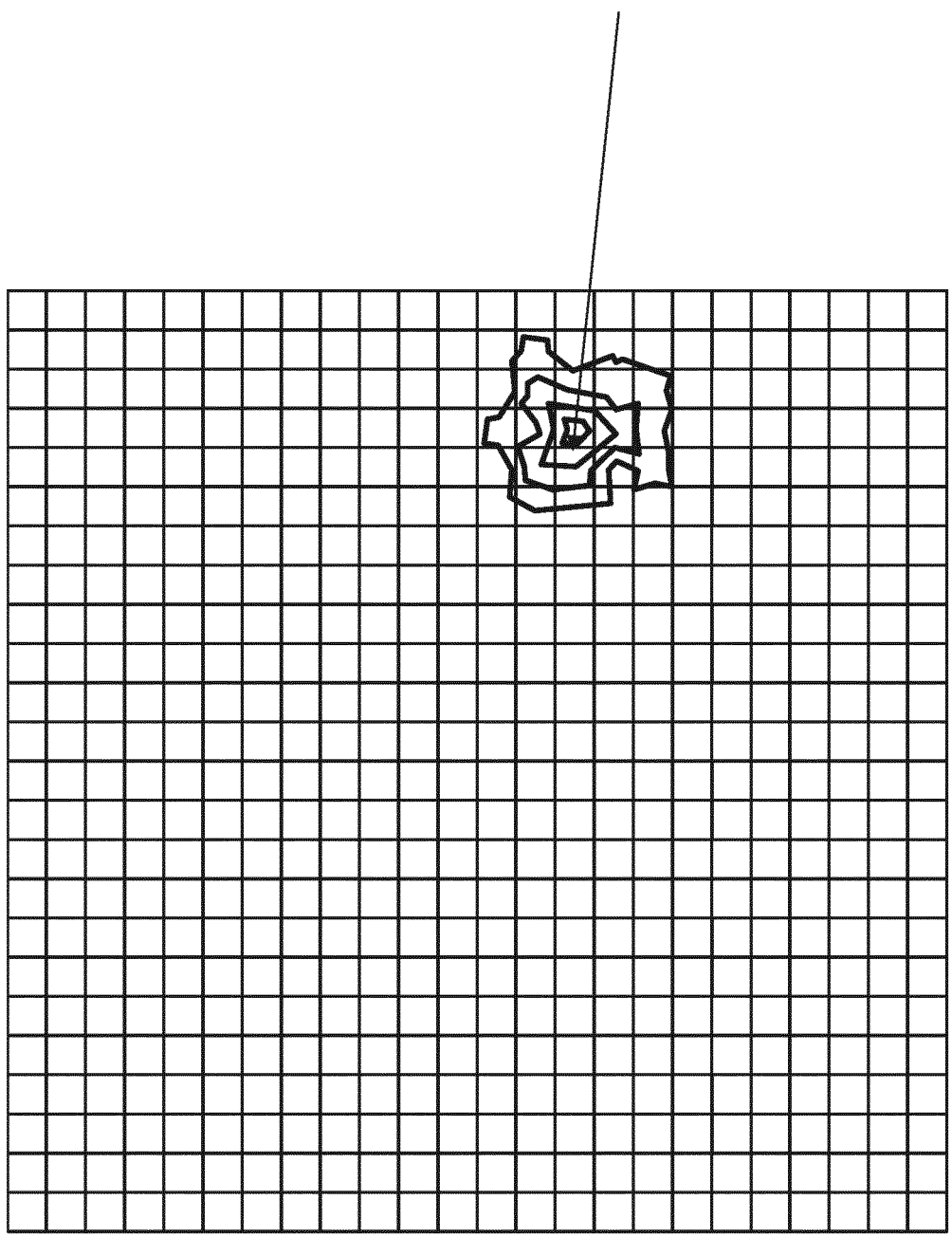
FIG. 4 illustrates an exemplary contour plot that represents the space the brutal force approach has to search when there are two parameters of the design rules.

FIG. 4 illustrates an exemplary contour plot that represents the space the brutal force approach has to search when there are two parameters of the design rules. The horizontal and vertical axes represent the values of the two parameters of the design rules. The depth represents the metric, higher value of which is more favorable. The brutal force approach has to calculate at each grid the optimal values of the parameters of the lithographic projection apparatus, before eventually finding the favorable value of the metric in the grid 1000 marked in FIG. 4.

Figure 5:
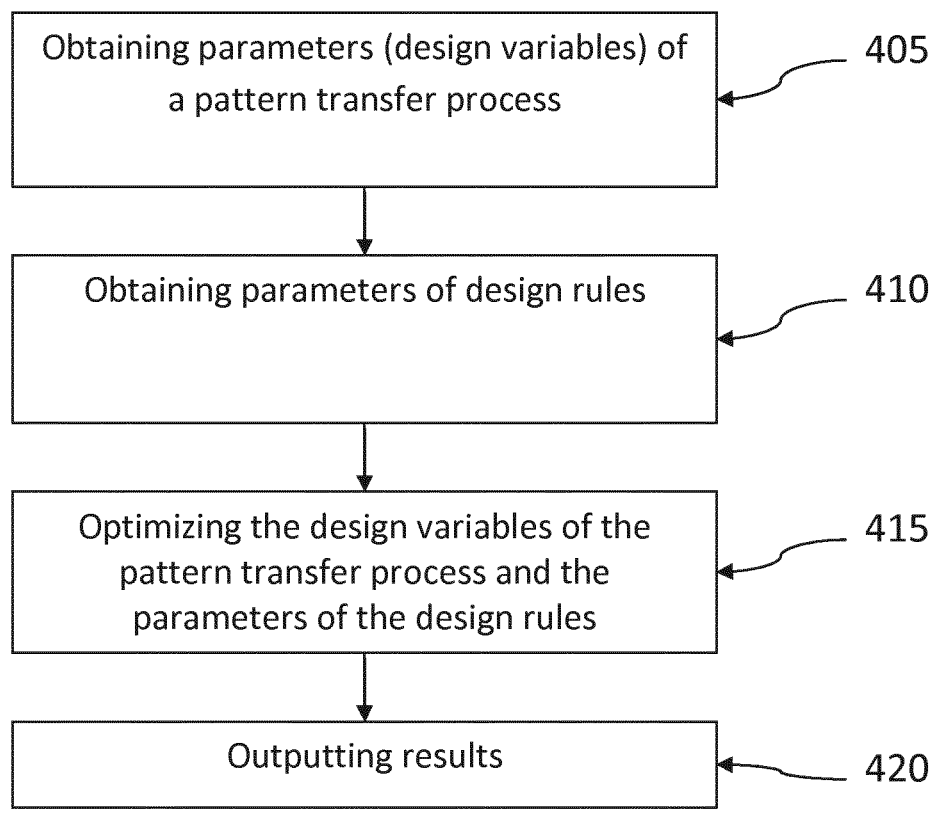
FIG. 5 shows a method of finding a favorable value of the metric characteristic of a pattern transfer process.

A method for finding the favorable value of the metric is shown in FIG. 5, according an embodiment. In step 405, parameters (interchangeably referred to as "design variables") of the pattern transfer process are obtained. In step 410, parameters (interchangeably referred to as "design variables") of design rules are obtained. In step 415, simultaneously optimizing the design variables of the pattern transfer process and the parameters of design rules. The optimization in step 415 is conducted to derive values of the design variables that yield the favorable value of the metric. Alternatively, the optimization in step 415 may include consecutively optimizing both the design variables of the pattern transfer process and the design variables of design rules. The results of the optimization, including values of the design variables of the pattern transfer process and values of the parameters of the design rules are output in step 420.

Examples of optimization methods can be found, for example, in U.S. patent application Ser. No. 12/914,946 filed Oct. 28, 2010, the disclosure of which is hereby incorporated by reference in its entirety.

In an embodiment, the optimization can be performed using a cost function, which may be expressed as follows $$CF(z_1, z_2, \cdots, z_N) = \sum_{p=1}^{P} w_p f_p^2(z_1, z_2, \cdots, z_N) \quad \text{(Eq. 1)}$$

wherein $(z_1, z_2, \ldots, z_N)$ are N design variables or values thereof; $(z_1, z_2, \ldots, z_N)$ include at least some design variable of the pattern transfer process and some design variables of the design rules; $f_p(z_1, z_2, \ldots, z_N)$ is a metric characteristic of the pattern transfer process, such as a difference between an actual value and an intended value of a characteristic at the p-th evaluation point for a set of values of the design variables of $(z_1, z_2, \ldots, z_N)$, focus, CD, image shift, image distortion, image rotation, edge placement error, resist contour distance, critical dimension uniformity, dose variation, focus variation, process condition variation, mask error (MEEF), mask complexity defect size, and focus shift, etc. $w_p$ is a weight constant assigned to $f_p(z_1, z_2, \ldots, z_N)$. Examples of the evaluation points can be any physical point or pattern on the wafer, or any point on a virtual design layout, or resist image, or aerial image. Since it is the resist image that often dictates the circuit pattern on a substrate, $f_p(z_1, z_2, \ldots, z_N)$ often includes a representation of the resist image. For example, $f_p(z_1, z_2, \ldots, z_N)$ of such an evaluation point can be simply a distance between a point in the resist image to an intended position of that point (i.e., edge placement error $EPE_p(z_1, z_2, \ldots, z_N)$). The design variables of the pattern transfer process can be any adjustable parameters such as adjustable parameters of the source, the reticle, the projection optics, dose, focus, etc. In an embodiment, at least some of the design variables are adjustable characteristics of the projection optics. The projection optics may include components collectively called a "wavefront manipulator" that can be used to adjust shapes of a wavefront and intensity distribution and/or phase shift of the irradiation beam. The projection optics can adjust a wavefront and intensity distribution at any location along an optical path of the lithographic projection apparatus, such as before the reticle, near a pupil plane, near an image plane, near a focal plane. The projection optics can be used to correct or compensate for certain distortions of the wavefront and intensity distribution caused by, for example, the source, the reticle, temperature variation in the lithographic projection apparatus, thermal expansion of components of the lithographic projection apparatus. Adjusting the wavefront and intensity distribution can change values of $f_p(z_1, z_2, \ldots, z_N)$ and the cost function. Such changes can be simulated from a model or actually measured.

It should be noted that the normal weighted root mean square (RMS) of $$f_p(z_1, z_2, \cdots, z_N) \text{ is defined as } \sqrt{\frac{1}{P}\sum_{p=1}^{P} w_p f_p^2(z_1, z_2, \cdots, z_N)},$$

therefore, minimizing the weighted RMS of $f_p(z_1, z_2, \ldots, z_N)$ is equivalent to minimizing the cost function $$CF(z_1, z_2, \cdots, z_N) = \sum_{p=1}^{P} w_p f_p^2(z_1, z_2, \cdots, z_N),$$

defined in Eq. 1. Thus the weighted RMS of $f_p(z_1, z_2, \ldots, z_N)$ and Eq. 1 may be utilized interchangeably for notational simplicity herein.

Further, if the PW (Process Window) is a metric, the cost function may include $f_p(z_1, z_2, \ldots, z_N)$ under different PW conditions. For example, if N PW conditions are considered, the cost functions can be written as $$CF(z_1, z_2, \cdots, z_N) = \sum_{p=1}^{P} w_p f_p^2(z_1, z_2, \cdots, z_N) \quad \text{(Eq. 1')}$$
$$= \sum_{n=1}^{N} \sum_{p_u=1}^{P_u} w_{p_n} f_{p_n}^2(z_1, z_2, \cdots, z_N)$$

where $f_{p_n}(z_1, z_2, \ldots, z_N)$ is under the n-th PW condition $n=1, \ldots, N$. When $f_{p_n}(z_1, z_2, \ldots, z_N)$ are the edge placement errors (EPE), then minimizing the above cost function in Eq. 1' is equivalent to minimizing the edge shift under various PW conditions, thus this leads to maximizing the PW. In particular, if the PW also consists of different mask bias, then minimizing the above cost function also includes the minimization of MEEF (Mask Error Enhancement Factor), which is defined as the ratio between the wafer EPE and the induced mask edge bias.

The design variables may have constraints, which can be expressed as $(z_1, z_2, \ldots, z_N) \in Z$, where Z is a set of possible values of the design variables. The constraints may represent physical restrictions in a hardware implementation of the lithographic projection apparatus. The constraints may include but not limited to one or more of: tuning ranges, interdependence between the design variables.

The optimization process of step 415 therefore is to find a set of values of the design variables, under the constraints $(z_1, z_2, \ldots, z_N) \in Z$, if any, that minimize the cost function, i.e., to find $$(\tilde{z}_1, \tilde{z}_2, \cdots \tilde{z}_N) = \operatorname*{argmin}_{(z_1, z_2, \cdots, z_N) \in Z} CF(z_1, z_2, \cdots, z_N) \quad \text{(Eq. 2)}$$

It should be appreciated that the cost function may have other suitable forms such as $$CF(z_1, z_2, \cdots, z_N) = \sum_{p=1}^{P} w_p f_p^4(z_1, z_2, \cdots, z_N),$$

$$CF = \sum_{n=1}^{N} |f_p(z_1, z_2, \cdots, z_N)|,$$

$$CF = \max_{i=1, \cdots, N} |f_p(z_1, z_2, \cdots, z_N)|$$

or a combination thereof.

The cost function can be minimized (or maximized for a cost function of certain form, such as $$CF = -\sum_{i=1}^{N} EPE_i^2$$

using any suitable method such as the Gauss-Newton algorithm, the interpolation method, the Levenberg-Marquardt algorithm, the gradient descent algorithm, simulated annealing, the interior point method, the genetic algorithm, solving polynomials.

Figure 1:
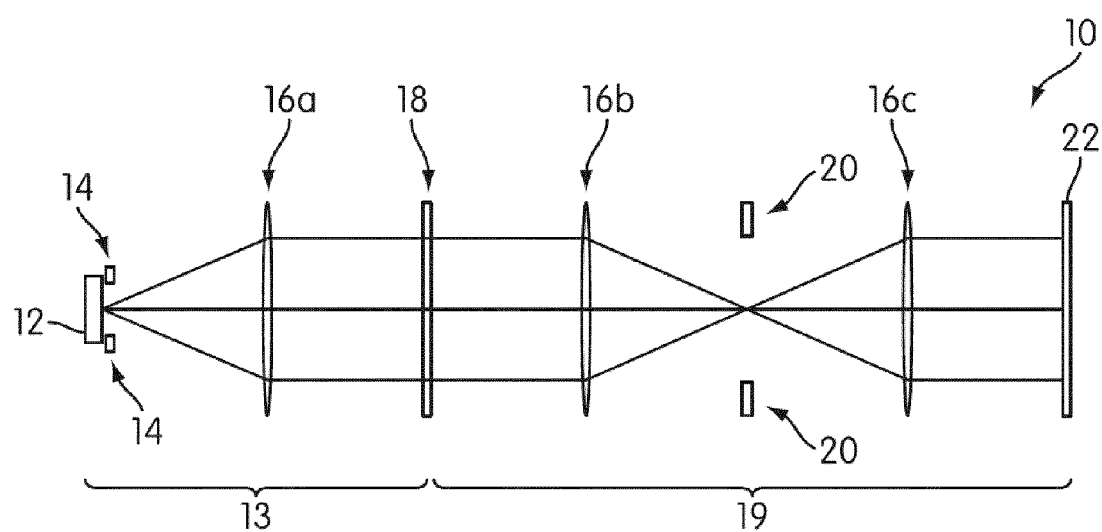
FIG. 1 illustrates an exemplary lithographic projection system.
Figure 2:
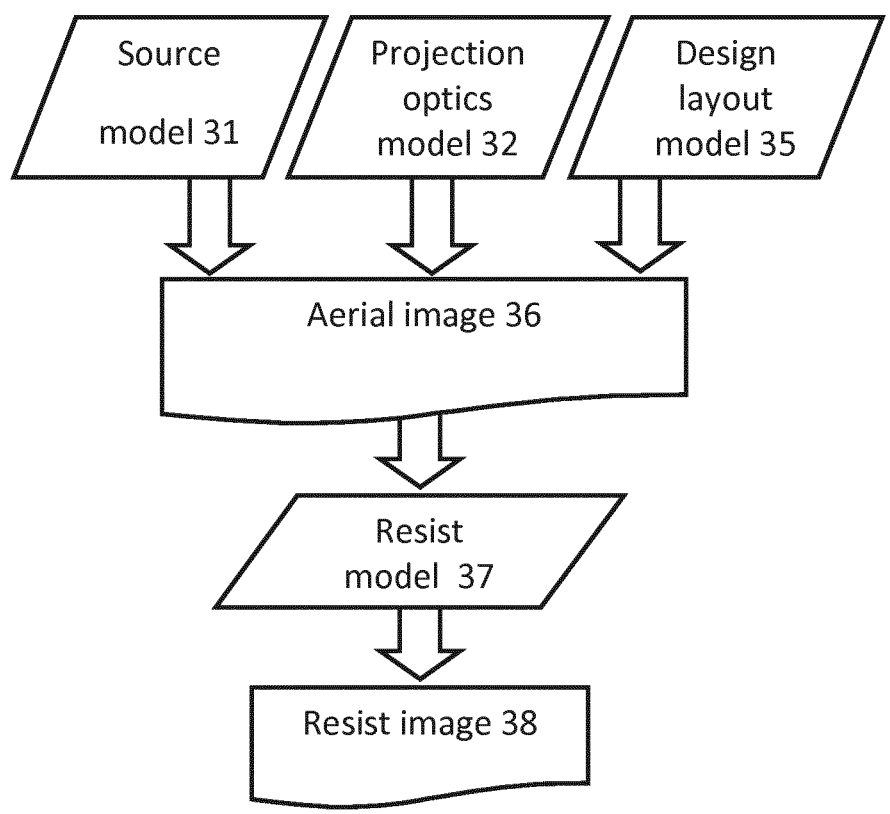
FIG. 2 shows an exemplary flow chart for simulating lithography in a lithographic projection apparatus.
Figure 6:
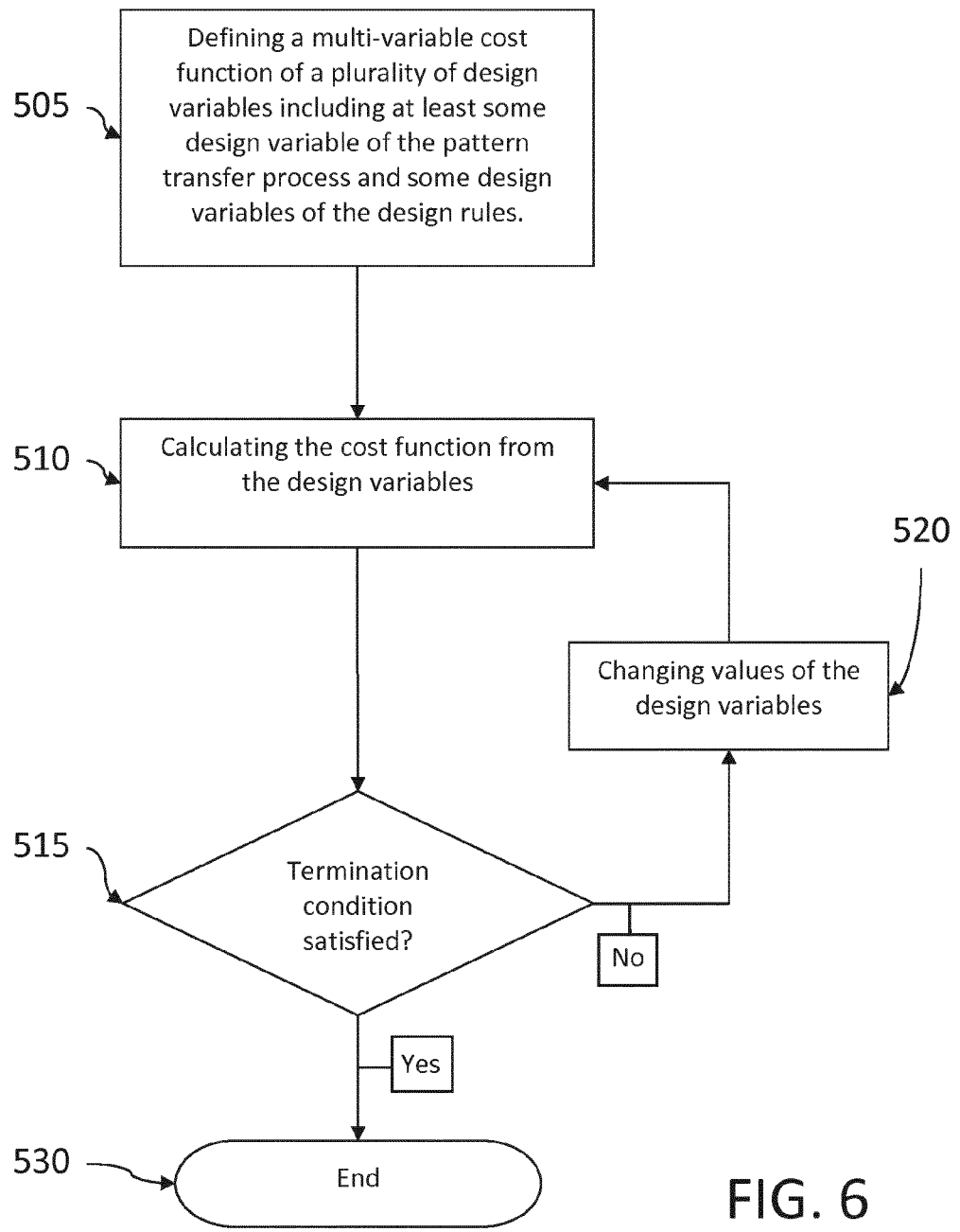
FIG. 6 shows an exemplary optimization process of a step of FIG. 5.

An exemplary optimization process of step 415 is further illustrated in FIG. 6. This optimization process comprises a step 505 of defining a multi-variable cost function of a plurality of design variables $(z_1, z_2, \ldots, z_N)$. $(z_1, z_2, \ldots, z_N)$ include at least some design variable of the pattern transfer process and some design variables of the design rules. The design variables $(z_1, z_2, \ldots, z_N)$ may include characteristics of the illumination source and the reticle design layout. In step 510, the cost function is calculated from the design variables. As will be appreciated by the skilled artisan, as part of calculating the cost function, the aerial image or the resist image may be calculated. This is done using the models depicted in FIG. 2. Once the cost function is calculated, the optimization process proceeds to step 515 where it is determined if a particular or predetermined termination condition is satisfied. The predetermined termination condition may be any suitable condition, such as the cost function reaching a minimum or a maximum, the cost function being equal to a threshold value or having crossed the threshold value, the cost function having reached within a preset error limit, or a preset number of iteration or a predefined computation time being reached. If the termination condition in step 515 is satisfied, the optimization process ends. If the termination condition in step 515 is not satisfied, the optimization process proceeds to step 520 where values of the design variables are changed, and then back to step 510 to reevaluate the cost function using the changed values of the design variables.

Procedures 510-520 are iteratively repeated until the termination condition is satisfied.

In the methods of FIGS. 5 and 6, the design variables of the pattern transfer process and the design variables of the design rules can be optimized simultaneously (referred to as simultaneous optimization), according to an embodiment, or can be optimized successively. The terms "simultaneous", "simultaneously", "joint" and "jointly" as used herein mean that the design variables of the pattern transfer process and the design variables of the design rules and/or any other design variables, are allowed to change at the same time.

Figure 7:
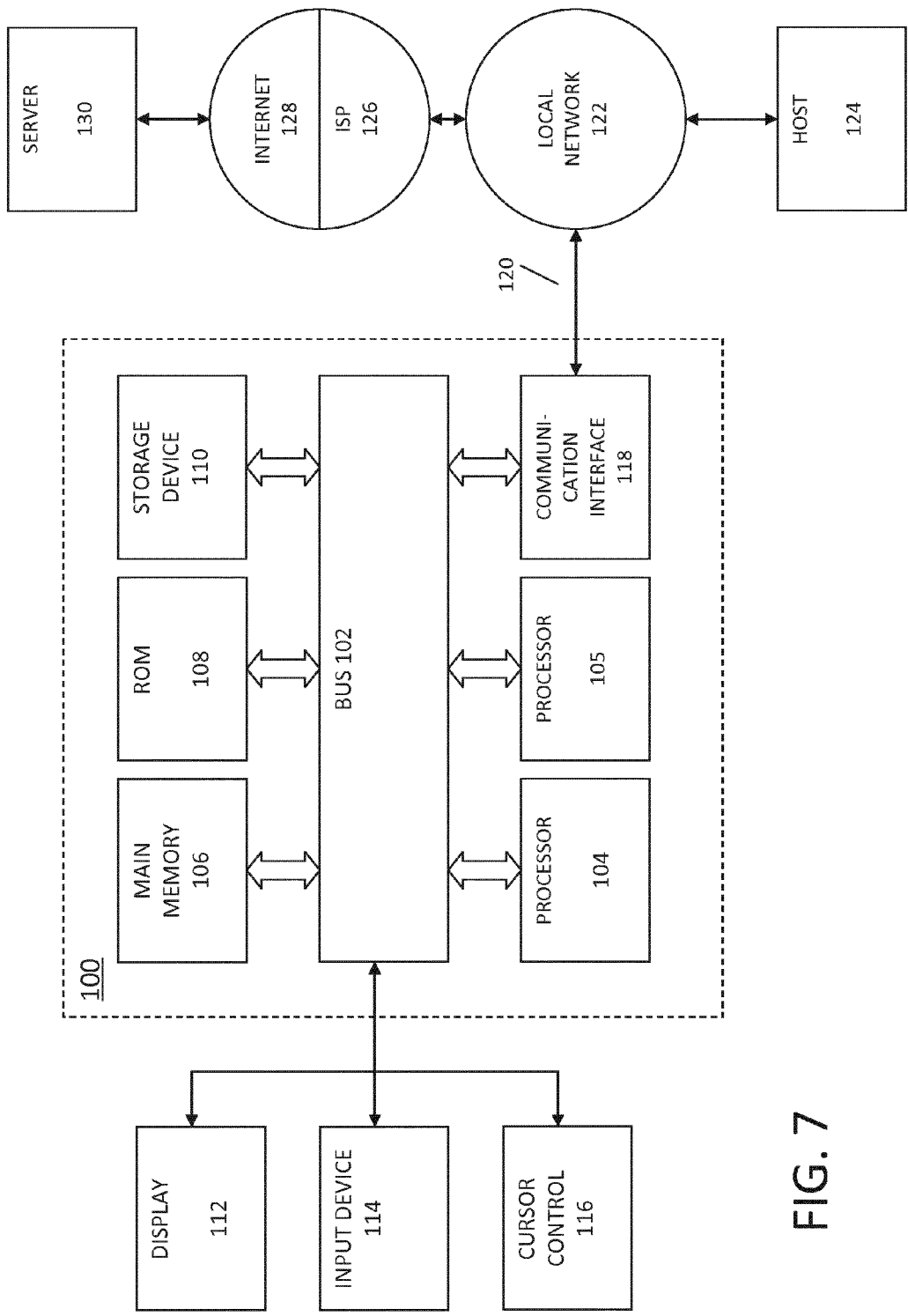
FIG. 7 is a block diagram of an example computer system in which embodiments can be implemented.

FIG. 7 is an exemplary block diagram that illustrates a computer system 100 which can assist in embodying and/or implementing the pattern selection method disclosed herein. Computer system 100 includes a bus 102 or other communication mechanism for communicating information, and one or more processor(s) 104 (and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the simulation process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with an embodiment, one such downloaded application provides for the test pattern selection of the embodiment, for example. The received code may be executed by processor 104 as it is received, and/or stored in storage device 110, or other non-volatile storage for later execution. In this manner, computer system 100 may obtain application code in the form of a carrier wave.

Figure 8:
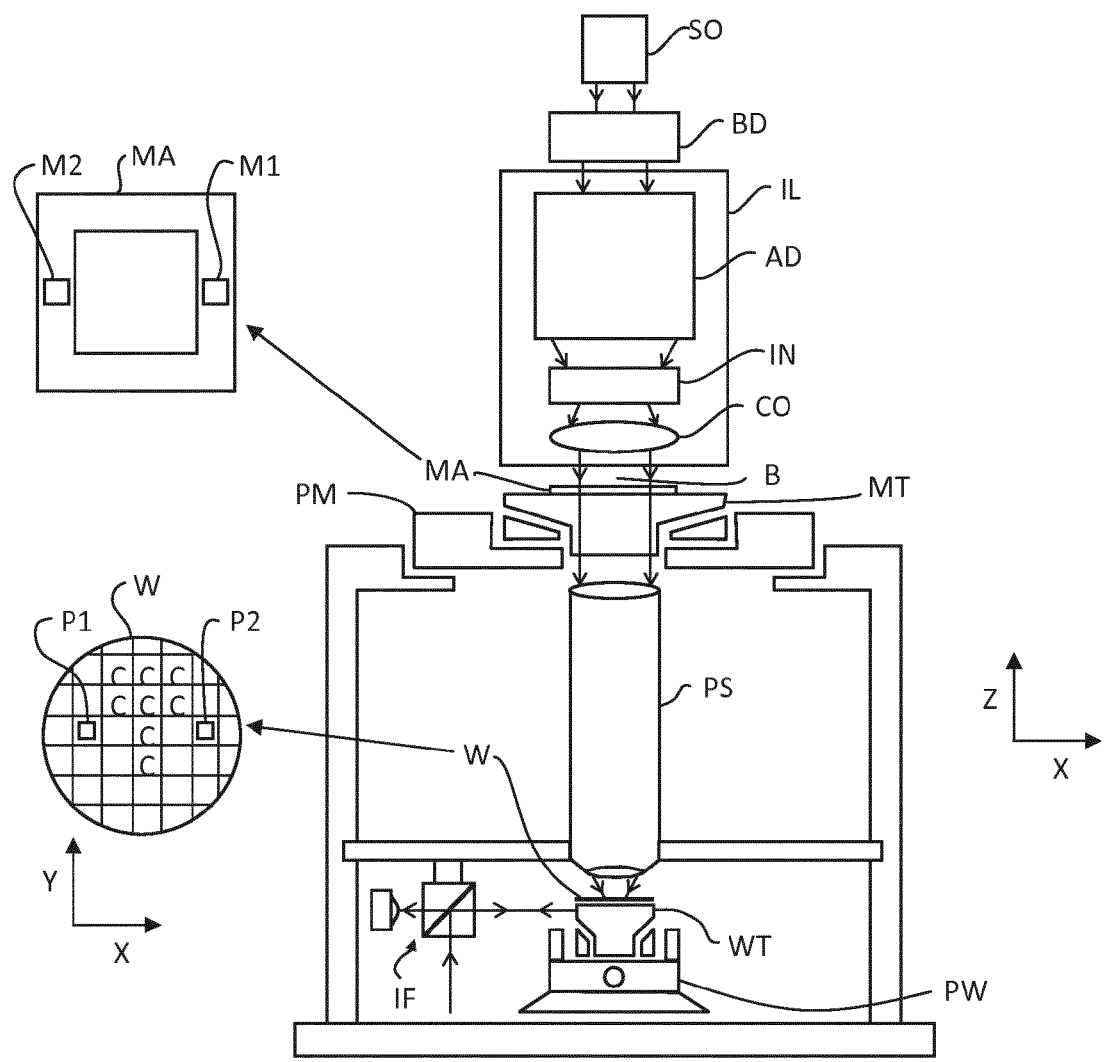
FIG. 8 is a schematic diagram of a lithographic projection apparatus to which embodiments are applicable.

FIG. 8 schematically depicts an exemplary lithographic projection apparatus whose performance could be simulated and/or optimized utilizing the methods described herein. The apparatus comprises:

- a radiation system Ex, IL, for supplying a projection beam B of radiation. In this particular case, the radiation system also comprises a radiation source SO;
- a first object table (mask table) MT provided with a mask holder for holding a mask MA (e.g., a reticle), and connected to first positioning means PM for accurately positioning the mask with respect to projection system PS;
- a second object table (substrate table) WT provided with a substrate holder for holding a substrate W (e.g., a resist coated silicon wafer), and connected to second positioning means PW for accurately positioning the substrate with respect to projection system PS;
- a projection system ("lens") PS (e.g., a refractive, catoptric or catadioptric optical system) for imaging an irradiated portion of the mask MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning means as an alternative to the use of a mask; examples include a programmable mirror array or LCD matrix.

The source SO (e.g., a mercury lamp or excimer laser) produces a beam of radiation. This beam is fed into an illumination system (illuminator) IL, either directly or after having traversed conditioning means, such as a beam expander or beam delivery system BD, for example. The illuminator IL may comprise adjusting means AD for setting the outer and/or inner radial extent (commonly referred to as -outer and -inner, respectively) of the intensity distribution in the beam. In addition, it will generally comprise various other components, such as an integrator IN and a condenser CO. In this way, the beam B impinging on the mask MA has a desired uniformity and intensity distribution in its cross section.

It should be noted with regard to FIG. 8 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing minors); this latter scenario is often the case when the source SO is an excimer laser (e.g., based on KrF, ArF or F2 lasing). The current invention encompasses at least both of these scenarios.

The beam B subsequently intercepts the mask MA, which is held on a mask table MT. Having traversed the mask MA, the beam B passes through the lens PS, which focuses the beam PS onto a target portion C of the substrate W. With the aid of the second positioning means (and interferometric measuring means IF), the substrate table WT can be moved accurately, e.g. so as to position different target portions C in the path of the beam B. Similarly, the first positioning means can be used to accurately position the mask MA with respect to the path of the beam B, e.g., after mechanical retrieval of the mask MA from a mask library, or during a scan. In general, movement of the object tables MT, WT will be realized with the aid of a long-stroke module (coarse positioning) and a short-stroke module (fine positioning), which are not explicitly depicted in FIG. 8. However, in the case of a wafer stepper (as opposed to a step-and-scan tool) the mask table MT may just be connected to a short stroke actuator, or may be fixed.

Patterning device MA and substrate W may be aligned using alignment marks M1, M2 in the patterning device, and alignment marks P1, P2 on the wafer, as required.

The depicted tool can be used in two different modes:

In step mode, the mask table MT is kept essentially stationary, and an entire mask image is projected in one go (i.e., a single "flash") onto a target portion C. The substrate table WT is then shifted in the x and/or y directions so that a different target portion C can be irradiated by the beam B;

In scan mode, essentially the same scenario applies, except that a given target portion C is not exposed in a single "flash". Instead, the mask table MT is movable in a given direction (the so called "scan direction", e.g., the y direction) with a speed v, so that the projection beam PB is caused to scan over a mask image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include DUV (deep ultra violet) lithography that is capable of producing a 193 nm wavelength with the use of a ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range. Because most materials are absorptive within this range, illumination may be produced by reflective minors with a multi-stack of Molybdenum and Silicon. The multi-stack minor has a 40 layer pairs of Molybdenum and Silicon where the thickness of each layer is a quarter wavelength. Even smaller wavelengths may be produced with X-ray lithography. Typically, a synchrotron is used to produce an X-ray wavelength. Since most material is absorptive at x-ray wavelengths, a thin piece of absorbing material defines where features would print (positive resist) or not print (negative resist).

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

It should be readily apparent to those of ordinary skill in the art that changes and modifications in the form and details may be made without departing from the spirit and scope. It is intended that the appended claims encompass such changes and modification. The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The invention may further be described using the following clauses:

1. A method for obtaining values of one or more design variables of one or more design rules for a pattern transfer process comprising a lithographic projection apparatus, the method comprising:
simultaneously optimizing one or more design variables of the pattern transfer process and the one or more design variables of the one or more design rules.

2. The method of clause 1, wherein the optimizing comprises deriving values of the one or more design variables of the pattern transfer process and the one or more design variables of the one or more design rules that yield a favorable value of a metric characteristic of the pattern transfer process.

3. The method of clause 1, wherein the optimizing comprises evaluating a cost function that measures a metric characteristic of the pattern transfer process, the cost function being a function of one or more design variables of the pattern transfer process and one or more design variables of the one or more design rules.

4. The method of any one of clauses 2-3, wherein the metric characteristic of the pattern transfer process is a process window of the pattern transfer process.

5. The method of any one of clauses 1-4, wherein the one or more design variables of the pattern transfer process are selected from a group consisting of parameters of the lithographic projection apparatus and parameters of pre-exposure or post-exposure procedures.

6. The method of any one of clauses 1-4, wherein the one or more design variables of the one or more design rules comprise one or more constraints on parameters of patterns configured for being imaged via the pattern transfer process.

7. The method of clause 6, wherein the parameters of patterns comprise geometric parameters of the patterns.

8. The method of clause 6, wherein the parameters of the patterns are selected from a group consisting of an edge-to-edge distance between two patterns, a height of a pattern, a width of a pattern, an absolute position of an edge of a pattern, a distance between an edge of a pattern to an extended line of another edge of the same pattern or of a different pattern, a corner-to-corner distance, a dimension of an overlap between two patterns, a distance between an edge of a pattern to a fixed point on the one or more reticles, an aspect ratio of a pattern, and pitches of an array of patterns.

9. The method of clause 6, wherein the patterns are configured for being imaged via different layers in the pattern transfer process.

10. The method of any one of clauses 1-9, wherein both the lithographic projection apparatus and the one or more design rules affect the pattern transfer process.

11. The method of clauses 2-3, wherein the optimizing comprises changing one or more values of the one or more design variables of the pattern transfer process and the one or more design variables of the one or more design rules, until a termination condition is satisfied.

12. The method of clauses 11, further comprising reevaluating the cost function.

13. The method of any one of clauses 11-12, wherein the termination condition includes one or more of: minimization of the cost function; maximization of the cost function; reaching a preset number of iterations; reaching a value of the cost function equal to or beyond a preset threshold value; reaching a predefined computation time; reaching a preset number iteration, and reaching a value of the cost function within a preset error limit.

14. The method of clause 13, wherein the cost function is minimized or maximized by a method selected from a group consisting of the Gauss-Newton algorithm, the interpolation method, the Levenberg-Marquardt algorithm, the gradient descent algorithm, simulated annealing, interior point method, and the genetic algorithm.

15. The method of clause 1, wherein the optimizing is performed under constraints of at least one of the one or more design variables of the pattern transfer process and the one or more design variables of the one or more design rules.

16. The method of any one of clauses 3, 12-15, wherein the cost function is a function of one or more of focus, CD, image shift, image distortion, image rotation, edge placement error, resist contour distance, critical dimension uniformity, dose variation, focus variation, process condition variation, mask error (MEEF), mask complexity defect size, and focus shift.

17. The method of clause 5, wherein the pre-exposure or post-exposure procedures comprise one or more of pre-exposure or post-exposure baking (e.g., temperature and duration), post-exposure etching (e.g., etchant composition, etching duration), resist coating, and resist development.

18. The method of clause 5, wherein the parameters of the lithographic projection apparatus comprise parameters of one or more of dose, mask bias, projection optics and illumination source shape.

19. A computer program product comprising a computer readable medium having instructions recorded thereon, the instructions when executed by a computer implementing the method of any of the above clauses.

The descriptions above are intended to be illustrative, not limiting. Thus, it will be apparent to one skilled in the art that modifications may be made to the embodiments as described without departing from the scope of the claims set out below.

What is claimed is:

1. A method comprising:
   optimizing, by a hardware computer system, a design variable of a pattern transfer process, involving a lithographic apparatus, for manufacturing devices and optimizing a design variable of a design rule for the pattern transfer process based on the optimizing of the design variable of the pattern transfer process, to determine a value of the design variable of the design rule; and
   using the design rule with the determined value to configure the pattern transfer process.

2. The method of claim 1, wherein the optimizing comprises deriving values of the design variable of the pattern transfer process and the design variable of the design rule that yield a favorable value of a metric characteristic of the pattern transfer process.

3. The method of claim 2, wherein the metric characteristic of the pattern transfer process is a process window of the pattern transfer process.

4. The method of claim 1, wherein the optimizing comprises evaluating a cost function that measures a metric characteristic of the pattern transfer process, the cost function being a function of the design variable of the pattern transfer process and the design variable of the design rule.

5. The method of claim 4, wherein the cost function is a function of one or more selected from: focus, critical dimension, image shift, image distortion, image rotation, edge placement error, resist contour distance, critical dimension uniformity, dose variation, focus variation, process condition variation, mask error (MEEF), mask complexity defect size, and/or focus shift.

6. The method of claim 4, wherein the optimizing comprises changing values of the design variable of the pattern transfer process and the design variable of the design rule, until a termination condition is satisfied.

7. The method of claim 6, further comprising reevaluating the cost function.

8. The method of claim 6, wherein the termination condition includes one or more selected from:
   minimization of the cost function;
   maximization of the cost function;
   reaching a preset number of iterations;
   reaching a value of the cost function equal to or beyond a preset threshold value;
   reaching a predefined computation time;
   reaching a preset number of iterations; and/or
   reaching a value of the cost function within a preset error limit.

9. The method of claim 1, wherein the design variable of the pattern transfer process is selected from a group consisting of a parameter of the lithographic apparatus, a parameter of a pre-exposure procedure and a parameter of a post-exposure procedure.

10. The method of claim 9, wherein the parameter comprises a parameter of a pre-exposure procedure or post-exposure procedure and the parameter of the pre-exposure or post-exposure procedure comprises one or more selected from: a pre-exposure or post-exposure baking parameter, a post-exposure etching parameter, a resist coating parameter, and/or a resist development parameter.

11. The method of claim 9, wherein the parameter comprises a parameter of the lithographic apparatus and the parameter of the lithographic apparatus comprises one or more selected from: dose, mask bias, a projection optics parameter and/or illumination source shape parameter.

12. The method of claim 1, wherein the design variable of the design rule comprises a constraint on a parameter of a pattern configured for being imaged via the pattern transfer process.

13. The method of claim 12, wherein the parameter of the pattern is selected from a group consisting of an edge-to-edge distance between two patterns, a height of a pattern, a width of a pattern, an absolute position of an edge of a pattern, a distance between an edge of a pattern to an extended line of another edge of the same pattern or of a different pattern, a corner-to-corner distance, a dimension of an overlap between two patterns, a distance between an edge of a pattern to a fixed point on a reticle, an aspect ratio of a pattern, and a pitch of an array of patterns.

14. The method of claim 1, wherein the optimizing is performed under a constraint of the design variable of the pattern transfer process and/or the design variable of the design rule.

15. A computer program product comprising a non-transitory computer readable medium having instructions recorded thereon, the instructions when executed by a computer implementing the method of claim 1.

16. The method of claim 1, wherein using the design rule comprises using the design rule with the determined value to generate a pattern layout for a physical patterning device and outputting an electronic data structure of the generated pattern layout for the manufacture or control of the physical patterning device.

17. The method of claim 1, wherein the optimizing comprises simultaneously optimizing the design variable of the pattern transfer process and the design variable of the design rule for the pattern transfer process.

18. The method of claim 17, wherein using the design rule comprises using the design rule with the value of the design variable of the design rule at the termination condition to generate a pattern layout for a physical patterning device and outputting an electronic data structure of the generated pattern layout for the manufacture or control of the physical patterning device.

19. A method comprising:
evaluating, by a hardware computer system, a cost function that assesses a metric characteristic of a pattern transfer process, involving a lithographic apparatus and physical patterning device, for manufacturing devices, the cost function being a function of a design variable of the pattern transfer process and a design variable of a design rule for the pattern transfer process;

changing a value of the design variable of the pattern transfer process and/or the design variable of the design rule and re-evaluating, by the hardware computer system, the cost function based on the changed value, until a termination condition is satisfied; and using the design rule with the value of the design variable of the design rule at the termination condition, to configure the pattern transfer process.

20. A computer program product comprising a non-transitory computer readable medium having instructions recorded thereon, the instructions, when executed by a computer, configured to cause the computer to:
optimize a design variable of a pattern transfer process, involving a lithographic apparatus, for manufacturing devices and optimize a design variable of a design rule for the pattern transfer process based on the optimizing of the design variable of the pattern transfer process, to determine a value of the design variable of the design rule; and use the design rule with the determined value to configure the pattern transfer process.

21. A computer program product comprising a non-transitory computer readable medium having instructions recorded thereon, the instructions, when executed by a computer, configured to cause the computer to:
evaluate a cost function that assesses a metric characteristic of a pattern transfer process, involving a lithographic apparatus and physical patterning device, for manufacturing devices, the cost function being a function of a design variable of the pattern transfer process and a design variable of a design rule for the pattern transfer process;

change a value of the design variable of the pattern transfer process and/or the design variable of the design rule and re-evaluate, by the hardware computer system, the cost function based on the changed value, until a termination condition is satisfied; and use the design rule with the value of the design variable of the design rule at the termination condition, to configure the pattern transfer process.

* * * * *

UNITED STATES PATENT AND TRADEMARK OFFICE
CERTIFICATE OF CORRECTION

PATENT NO. : 9,489,479 B2
APPLICATION NO. : 14/398416
DATED : November 8, 2016
INVENTOR(S) : Xiaofeng Liu Page 1 of 1

It is certified that error appears in the above-identified patent and that said Letters Patent is hereby corrected as shown below:

On the Title Page

Column 1, Item (54) Title:
Replace "RULE AND LITHOGRAPHIC PROCESS CO-OPTIMIZATION"
With --DESIGN RULE AND LITHOGRAPHIC PROCESS CO-OPTIMIZATION--.

On Page 2, Column 2, Item (56) References Cited - Other Publications, After Line 3:
Insert --Mulders, Thomas et al., "Simultaneous source-mask optimization: a numerical combining method", 2010, SPIE, Vol. 7823, 78233X, pages 1-12--.

Signed and Sealed this
Sixth Day of June, 2017

Michelle K. Lee
*Director of the United States Patent and Trademark Office*